(12) United States Patent
Chrysanthakopoulos

(10) Patent No.: US 12,197,059 B2
(45) Date of Patent: Jan. 14, 2025

(54) SYSTEM WITH SALT-BASED COLOR ADJUSTMENT OF SUBSTRATE

(71) Applicant: BIC Violex Single Member S.A., Anoixi (GR)

(72) Inventor: Nikolaos Chrysanthakopoulos, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 71 days.

(21) Appl. No.: 18/192,248

(22) Filed: Mar. 29, 2023

(65) Prior Publication Data

US 2023/0314858 A1   Oct. 5, 2023

(30) Foreign Application Priority Data

Mar. 30, 2022   (EP) .................................... 22165526

(51) Int. Cl.

| | | |
|---|---|---|
| G02F 1/1333 | (2006.01) | |
| G02F 1/13 | (2006.01) | |
| G02F 1/1337 | (2006.01) | |
| G02F 1/137 | (2006.01) | |
| G06F 3/041 | (2006.01) | |

(52) U.S. Cl.
CPC ........ *G02F 1/13338* (2013.01); *G02F 1/1313* (2013.01); *G02F 1/133311* (2021.01); *G02F 1/133723* (2013.01); *G02F 1/13718* (2013.01); *G06F 3/04162* (2019.05)

(58) Field of Classification Search
CPC .................................................. G02F 1/13338

USPC .......................................................... 349/12
See application file for complete search history.

(56) References Cited

U.S. PATENT DOCUMENTS

| | | | |
|---|---|---|---|
| 4,212,393 A | 7/1980 | Lenkoff | |
| 5,678,863 A | 10/1997 | Knight et al. | |
| 2005/0019090 A1 | 1/2005 | Takasu | |
| 2006/0053975 A1* | 3/2006 | Shibahashi | B43K 23/12 |
| | | | 252/586 |
| 2006/0279587 A1* | 12/2006 | Furuichi | B41J 19/142 |
| | | | 347/5 |

(Continued)

FOREIGN PATENT DOCUMENTS

| | | |
|---|---|---|
| KR | 20090076065 A | 7/2009 |
| KR | 102147599 B1 | 8/2020 |
| WO | 2020180011 A1 | 9/2020 |

OTHER PUBLICATIONS

"Printable, Colorful Camouflage with Polymers" Paint & Coating Industry, May 4, 2018, Copyright © 2023. All Rights Reserved BNP Media. https://www.pcimag.com/articles/104773-printable-colorful-camouflage-with-polymers (5 pages).

(Continued)

*Primary Examiner* — Charles S Chang
(74) *Attorney, Agent, or Firm* — Bookoff McAndrews, PLLC

(57) ABSTRACT

In a first aspect, the present disclosure relates to a system comprising a writing instrument, wherein the writing instrument comprises a solution of one or more salts and a writing orifice. Furthermore, the system comprises a drawing substrate configured to change color based on the concentration of the one or more salts and/or water content, wherein the drawing substrate comprises cholesteric liquid-crystals.

18 Claims, 3 Drawing Sheets

(56) References Cited

U.S. PATENT DOCUMENTS

| | | |
|---|---|---|
| 2007/0082977 A1* | 4/2007 | Shibahashi ............ C09D 11/50 523/161 |
| 2009/0033811 A1 | 2/2009 | Schneider |
| 2010/0178508 A1 | 7/2010 | Kasch et al. |
| 2014/0340589 A1 | 11/2014 | Montbach et al. |
| 2015/0286085 A1 | 10/2015 | Davis et al. |
| 2016/0347081 A1 | 12/2016 | Fukasawa |
| 2019/0285923 A1 | 9/2019 | Liao et al. |
| 2019/0293981 A1 | 9/2019 | Liao et al. |
| 2019/0324308 A1 | 10/2019 | Liao et al. |

OTHER PUBLICATIONS

European Search Report issued in European Application No. 22 16 5526, issued on Sep. 21, 2022 (11 pages).

Monali Moirangthem and Albertus P. H. J. Schenning, "Full Color Camouflage in a Printable Photonic Blue-Colored Polymer," in ACS Applied Materials & Interfaces, 2018, 10, 4168-4172, downloaded via 63.209.178.11 on Mar. 22, 2023, doi: 10.1021/acsami.7b17892.

Qingsong Li, et al., "Sub-micron silk fibroin film with high humidity sensibility through color changing" The Royal Society of Chemistry, Adv., 2017, 7, 17889-17897, Open Access Article. Published on Mar. 23, 2017, doi: 10.1039/c6ra28460d.

Timothy J. Whitem Michael E. McConney and Timothy J, Bunning, "Dynamic color in stimuli-responsive cholesteric liquid crystals" The Royal Society of Chemistry, Journal of Materials Chemistry, 2010, 20, 9832-9847, downloaded by Pennsylvania State University on May 10, 2012, doi: 10.1039/C0JM00843E.

Yongqing Xia, et al., "Tough, Freestanding, and Colorless Photonic Paper Using Water as Ink" Advance Science News, Advanced Materials Interfaces, Wiley-VCH Verlag Gmbh & Co. KGaA, Weinheim, 2019, 1901363, doi: 10.1002/admi.201901363.

\* cited by examiner

SYSTEM WITH SALT-BASED COLOR ADJUSTMENT OF SUBSTRATE

This application claims priority from the European Patent Application No. 22165526.9, titled: "SYSTEM WITH SALT-BASED COLOR ADJUSTMENT OF SUBSTRATE", filed on 30 Mar. 2022, its content being incorporated herein by reference.

TECHNICAL FIELD

The present disclosure relates to the field of drawing substrates and writing instruments. More specifically, the present disclosure relates to drawing substrates whose color can be altered with writing instruments comprising salt solutions.

BACKGROUND

Typical writing instruments comprise pigments or dyes as colorants. By switching between writing instruments comprising different colorants, a user can produce drawings with varying colors. Switching between writing instruments can be a nuisance to a user. Further, colors produced by writing instruments comprising colorants may appear dull to users.

In nature structural coloration is observed. For example, the feather of peacocks or the fur of golden moles exhibit structural coloration. Structural coloration occurs when microscopically structured surfaces interfere with visible light. Surfaces may appear in different colors depending on the spatial configuration of the surface without the need for pigments and/or dyes. In the case of peacock feathers the feathers further show iridescence due to the structural coloration. Iridescence is a visual effect wherein certain surfaces appear to gradually change color with changing angle of view or illumination. Iridescence is rarely observed in images created by typical writing instrument comprising pigments or dyes.

The present disclosure aims to provide a novel writing system allowing the provision of different colors with a single writing instrument.

SUMMARY

In a first aspect, the present disclosure relates to a system comprising a writing instrument, wherein the writing instrument comprises a solution of one or more salts and a writing orifice. Furthermore, the system comprises a drawing substrate configured to change color based on the concentration of the one or more salts and/or water content, wherein the drawing substrate comprises cholesteric liquid-crystals.

Salt

In some embodiments, the one or more salts may comprise a cation capable of forming a chelation complex, more specifically a cation capable of forming a chelation complex with one or more carboxylic groups and in particular a cation capable of forming a chelation complex with two carboxylic groups.

In some embodiments, the one or more salts may comprise an alkaline earth metal salt, in particular a calcium salt.

In some embodiments, the one or more salts may comprise a monovalent anion, in particular a nitrite.

In some embodiments, the one or more salts may comprise a calcium salt, more specifically wherein the one or more salts may comprise at least 85% of the calcium salt, even more specifically at least 90 wt.-% of the calcium salt and in particular wherein the one or more salts may comprise at least 98 wt.-% of the calcium salt, relative to the total weight of the one or more salts.

In some embodiments, the one or more salts may comprise $Ca(NO_3)_2$, more specifically wherein the one or more salts may comprise at least 85% of $Ca(NO_3)_2$, even more specifically at least 90 wt.-% $Ca(NO_3)_2$ and in particular wherein the one or more salts may comprise at least 98 wt.-% $Ca(NO_3)_2$, relative to the total weight of the one or more salts.

Cholesteric Liquid-Crystal

In some embodiments, the cholesteric liquid-crystals may be present in the form of a photonic crystals, more specifically as cholesteric liquid crystals layer.

In some embodiments, the cholesteric liquid crystals may comprise cholesteric liquid crystal polymers.

In some embodiments, the cholesteric liquid crystals may comprise polymer stabilized cholesteric liquid crystals.

In some embodiments, the cholesteric liquid crystals may comprise cholesteryl benzoate, cholesteryl nonanoate and/or cholesteryl oleyl carbonate.

In some embodiments, the cholesteric liquid crystals may comprise 1,4-Bis-[4-(3-acryloyloxypropyloxy)benzoyloxy]-2-Methylbenzene, 4-Methoxyphenyl 4-((6-(acryloyloxy)hexyl)oxy)benzoate, 4-(acryloyloxyhexyloxy) benzoic acid, 2-Methyl-4-[6-(acryloyloxy)hexyloxy]benzoic acid, 4-Cyano-4'-pentylbiphenyl, 1,4:3,6-Dianhydro-D-glucitol bis[4-[[4-[[[4-[(1-oxo-2-propenyl)oxy]butoxy]carbonyl]oxy]benzoyl]oxy]benzoate], and/or 1,2-Diphenyl-2,2-dimethoxyethanone.

Carrier Structure

In some embodiments, the drawing substrate may comprise a carrier structure, in particular a carrier layer.

In some embodiments, the carrier structure may comprise paper, glass and/or a polymer.

In some embodiments, the drawing substrate may be comprised within a notebook.

In some embodiments, the carrier structure may be removably attached to the drawing substrate.

Water Absorption

In some embodiments, the drawing substrate may be configured to absorb water.

In some embodiments, the drawing substrate may comprise a water-absorbing layer.

In some embodiments, the drawing substrate may comprise a water-absorbing polymer, more specifically a thermoresponsive polymer and/or a superabsorbent polymer, and in particular poly(N-isopropylacrylamide) and/or cellulose acetate nanofibers.

In some embodiments, the water-absorbing layer may comprise a hydrophilic salt, in particular calcium chloride.

In some embodiments, the water-absorbing polymer may comprise carbon fiber nanotubes.

Adhesive

In some embodiments, the drawing substrate may be configured to be adhesive, in particular wherein the carrier structure may be configured to be adhesive.

In some embodiments, the drawing substrate may comprise an adhesive.

In some embodiments, the drawing substrate may comprise an adhesive layer.

In some embodiments, the adhesive may comprise an acrylic adhesive, a rubber and/or a silicone.

Water Impermeable layer

In some embodiments, the drawing substrate may comprise a water impermeable layer.

Writing Instrument

In some embodiments, the writing instrument may comprise a writing orifice, more specifically wherein the writing orifice comprises, a felt tip, a writing ball or a nib.

In some embodiments, the writing instrument may be a handheld writing instrument.

In some embodiments, the solution may be an aqueous solution.

In some embodiments, writing instrument may comprise an ink container, more specifically an ink container comprising the solution.

In some embodiments, the concentration of the one or more salts in the solution may be between about 0.01 mM to about 100 mM, more specifically between about 0.1 mM to about 50 M and in particular between about 1 M to about 10 mM.

In some embodiments, the writing instrument may comprise a first water container, wherein the first water container may comprise at least water.

In some embodiments, a material of the ink container and/or the first water container may comprise a polymer, a metal and/or a ceramic.

Selection Mechanism

In some embodiments, the writing instrument may comprise a mixing chamber fluidly connected to the ink container, the first water container and the writing orifice.

In some embodiments, the writing instrument may comprise a concentration adjustment mechanism, wherein the concentration adjustment mechanism may be configured to adjust the concentration the one or more salts in the solution dispensed by the writing instrument.

In some embodiments, the concentration adjustment mechanism may comprise a control wheel and/or a slider button.

In some embodiments, the writing instrument may comprise a plurality of containers comprising different concentration of the one or more salts in the solution, wherein the concentration adjustment mechanism may be configured to switch between the plurality of containers.

Water Spraying Mechanism

In some embodiments, the system may comprise a spraying mechanism configured to create an aerosol, in particular a water aerosol.

In some embodiments, the system may comprise a second water container fluidly connected to the spraying mechanism.

In some embodiments, the spraying mechanism may be comprised within the writing instrument.

In some embodiments, the spraying mechanism may be fluidly connected to the first water container.

Layers

In some embodiments, the drawing substrate may comprise at least two layers, wherein a top layer may be the cholesteric crystal layer and a bottom layer may be the carrier layer, in particular wherein the top layer may be configured to be written upon.

In some embodiments, the drawing substrate may comprise at least three layers, wherein a top layer may be the cholesteric crystal layer, a middle layer may be the water-absorbent layer and a bottom layer may be the carrier layer.

In some embodiments, the adhesive layer may be placed between the middle layer and bottom layer, or the adhesive layer may be placed between the top layer and the bottom layer.

In some embodiments, the adhesive layer may be connected to the bottom layer.

Standalone

In a second aspect, the present disclosure relates to a writing instrument according to any preceding embodiment.

In a third aspect, the present disclosure relates to a use of a writing instrument as defined in any preceding embodiment for marking a drawing substrate as defined in any preceding embodiment.

In a fourth aspect, the present disclosure relates to a use of a drawing substrate as defined in any preceding embodiment for being marked by a solution as defined in any of the preceding embodiments or by a writing instrument as defined in any of the preceding embodiments.

In a fifth aspect, the present disclosure relates to a use of the solution of one or more salts as defined in any of the preceding embodiments in a writing instrument as defined in any of the preceding embodiment or a system as defined in any of the preceding embodiments.

In a sixth aspect, the present disclosure relates to a drawing substrate according to any preceding embodiment.

In a seventh aspect, the present disclosure relates to the spraying mechanism according to any preceding embodiment.

Method of Manufacturing

In an eighth aspect, the present disclosure relates to a method for manufacturing a drawing substrate according to any preceding embodiment, wherein the method comprises the following steps:

dissolving one or more mesogens in a first solvent;
    applying the one or more mesogens to a carrier structure;
    evaporating the first solvent;
    shearing the mesogens along one direction;
    curing the one or more mesogens by exposure to UV-light;
    rinsing the cured one or more mesogens with a second solvent;
    rinsing the cured one or more mesogens with KOH.

In some embodiments according to the eighth aspect, the one or more mesogens may comprise 1,4-Bis-[4-(3-acryloyloxypropyloxy)benzoyloxy]-2-Methylbenzene, 4-Methoxyphenyl 4-((6-(acryloyloxy)hexyl)oxy)benzoate, 4-(acryloyloxyhexyloxy) benzoic acid, 2-Methyl-4-[6-(acryloyloxy)hexyloxy]benzoic acid, 4-Cyano-4'-pentylbiphenyl, 1,4:3,6-Dianhydro-D-glucitol bis[4-[[4-[[[4-[(1-oxo-2-propenyl)oxy]butoxy]carbonyl]oxy]benzoyl]oxy]benzoate], 1,2-Diphenyl-2,2-dimethoxyethanone and/or 4-Cyano-4'-pentylbiphenyl and in particular 4-Cyano-4'-pentylbiphenyl.

In some embodiments according to the eighth aspect, the one or more mesogens may comprise between about 15 wt.-% to about 20 wt.-% of 1,4-Bis-[4-(3-acryloyloxypropyloxy)benzoyloxy]-2-Methylbenzene, between about 20 wt.-% to about 25 wt.-% of 4-Methoxyphenyl 4-((6-(acryloyloxy)hexyl)oxy)benzoate, between about 15 wt.-% to about 20 wt.-% of 4-(acryloyloxyhexyloxy) benzoic acid, between about 15 wt.-% to about 20 wt.-% of 2-Methyl-4-[6-(acryloyloxy)hexyloxy]benzoic acid, between about 15 wt.-% to about 20 wt.-% of 4-Cyano-4'-pentylbiphenyl, between about 3 wt.-% to about 7 wt.-% of 1,4:3,6-Dianhydro-D-glucitol bis[4-[[4-[[[4-[(1-oxo-2-propenyl)oxy]butoxy]carbonyl]oxy]benzoyl]oxy]benzoate] and/or between about 0.30 wt.-% to about 1 wt.-% of 1,2-Diphenyl-2,2-dimethoxyethanone.

In some embodiments according to the eighth aspect, the carrier structure may comprise paper, glass and/or a polymer.

In some embodiments according to the eighth aspect, the first solvent may be an aprotic solvent, in particular tetrahydrofuran.

In some embodiments according to the eighth aspect, the curing by UV light may be performed between about 1 min to about 60 min, more specifically between about 2 min to about 30 min and in particular 3 min to about 10 min.

In some embodiments according to the eighth aspect, the KOH may have a concentration between about 10 mM to about 10 M, more specifically between about 100 mM to about 5 M and in particular between about 500 mM to about 2 M.

In some embodiments according to the eighth aspect, the shearing of the mesogens may be performed by placing a glass sheet on the one or more mesogens and dragging it in the one direction, in particular wherein the glass may be a fluorinated alkylsilane glass.

In some embodiments according to the eighth aspect, the shearing may be performed at between about 15 to about 30° C., and in particular at room temperature.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting embodiments. Common reference numerals on different Figures indicate like or similar features.

DETAILED DESCRIPTION

Figure 1:
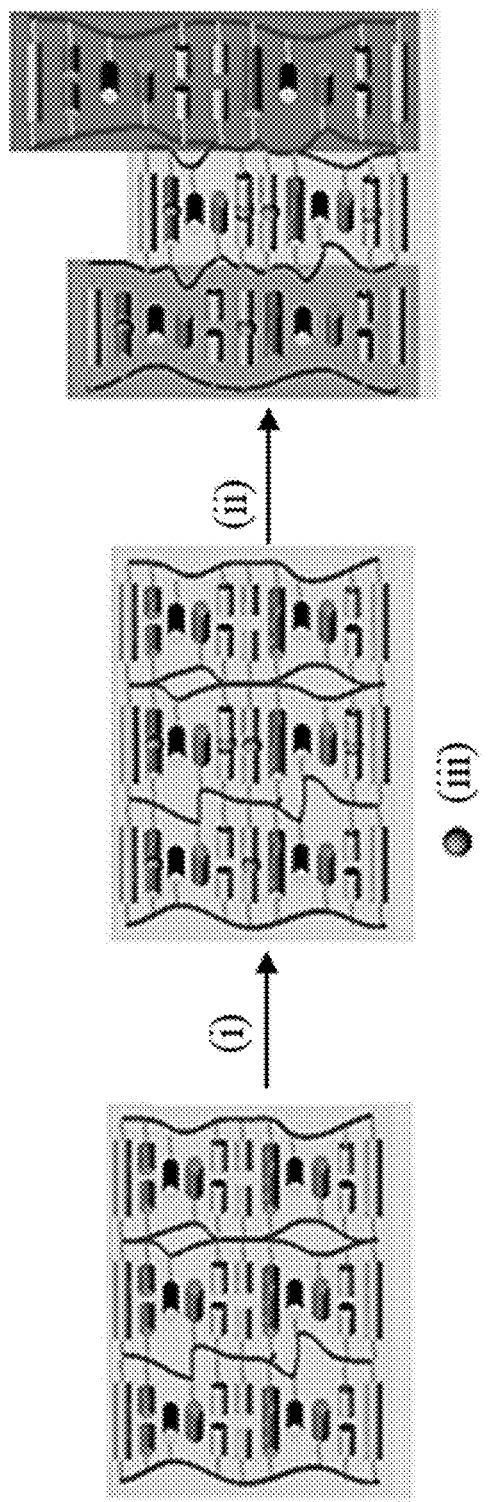
FIG. 1 schematically shows the introduction (i) of metal ions (iii) into cholesteric liquid crystals and swelling (ii) of the cholesteric liquid crystals by water.

Hereinafter, a detailed description will be given of the present disclosure. The terms or words used in the description and the aspects of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

It has been found that the color of a drawing substrate comprising cholesteric liquid-crystals may be controlled by adjusting the salt and/or water content therein.

Accordingly, in a first aspect, the present disclosure relates to a system comprising a writing instrument, wherein the writing instrument comprises a solution of one or more salts and a writing orifice. Furthermore, the system comprises a drawing substrate configured to change color based on the concentration of the one or more salts and/or water content, wherein the drawing substrate comprises cholesteric liquid-crystals.

A user may make use of the system according to the first aspect, for example by drawing a structure on the drawing substrate with the writing instrument. The drawing substrate may then show the regions where the user drew with the writing instrument in a different color than the rest of the drawing substrate. When the drawing substrate dries, the drawn structure may display the color of the surrounding structures. The drawn structure may resurface when water is added to the drawing substrate, for example by spraying water on the drawing substrate or breathing on it.

Without wishing to be bound by theory, the color-changing effect may rely on structural coloration. In particular, the color-changing effect may rely on the drawing substrate comprising cholesteric liquid crystals. The term "cholesteric liquid crystals" within this disclosure i.a. refers to its common meaning in the art. Additionally or alternatively the term "cholesteric liquid crystals" may refer to a liquid crystal with a helical structure. The term "liquid crystal" within this disclosure i.a. refers to its common meaning in the art. Additionally or alternatively the term "liquid crystal" may refer to a state of matter, wherein the state of matter exhibits properties between those of conventional liquids and those of solid crystals. Additionally or alternatively, the term "liquid crystal" may refer to a material, wherein the term material may flow like a liquid and the material's molecules may be oriented in a crystal-like structure.

Additionally or alternatively the term "cholesteric liquid crystals" may refer to a plurality of layers affecting the motion of light (photons), in particular a plurality of layers affecting the motion of light (photons) exhibiting a periodicity. Additionally or alternatively the term "cholesteric liquid crystals" may refer to a plurality of layers, wherein the layers have no positional ordering within the layers, but a director axis which varies with layers, more specifically wherein the variation of the director axis is periodic and in particular wherein a length of a full and/or half period determines a wavelength of reflected light. The full period may also be referred to as pitch p. The term "period" within this disclosure i.a. refers to its common meaning in the art. Additionally or alternatively the term "period" may refer to a length of a recurring interval, wherein the director axis exhibits a rotation of 360° within each recurring interval.

Without wishing to be bound by theory, the cholesteric liquid crystals may form one or more photonic crystal, in particular one-dimensional photonic crystals. The term "photonic crystal" within this disclosure i.a. refers to its common meaning in the art. Additionally or alternatively the term "photonic crystal" may refer to a plurality of layers affecting the motion of light (photons), in particular a plurality of layers affecting the motion of light (photons) exhibiting a periodicity. Additionally or alternatively the term "photonic crystal" may refer to a plurality of layers having a photonic band-gap in at least one dimension.

Again, without wishing to be bound by theory, the photonic crystals may affect the motion of photons, in particular crystals may affect the motion of photons by exhibiting a photonic band-gap. The photonic band-gap allows light with a wavelength outside the photonic band-gap range to propagate through the plurality of layers, while light with a wavelength in the range of the photonic band-gap range cannot propagate. For light to be diffracted, the periodicity of a plurality of layers must correspond approximately to half of the wavelength of the light to be diffracted. The plurality of layers of the photonic crystal may correspond to the plurality of layers of the cholesteric liquid crystal. The photonic band-gap may therefore depend upon the periodicity of the layers of the cholesteric liquid crystals.

Cholesteric liquid crystals may be a cholesteric liquid crystal polymer. The term "cholesteric liquid crystal polymer" within this disclosure i.a. refers to its common meaning in the art. Additionally or alternatively the term "cholesteric liquid crystal polymer" may refer to a polymer with a helical structure. Additionally or alternatively the term "cholesteric liquid crystal polymer" may refer to a polymer forming a plurality of layers affecting the motion of light (photons), in particular wherein the plurality of layers exhibits a periodicity. The plurality of layers within the cholesteric liquid crystal polymer may exhibit similar properties as the plurality of layers within cholesteric liquid crystals as defined above, including but not limited to having a director axis, in particular a periodic director axis.

During polymerization of the cholesteric liquid crystal polymer, missing cross-links/faults can be introduced into the polymer, in particular into the polymer's network, by adding non reactive species, e.g. non reactive mesogens, that do not react with adjacent mesogens to a reaction mixture. For example, the faults may be two not linked carboxylic acid groups, in particular benzoic acid groups.

As mentioned above, the cholesteric liquid crystal polymer may exhibit missing cross-links/faults within its polymer network. Without wishing to be bound by theory, the missing cross-links/faults may allow the cholesteric liquid crystal polymer to swell with water by a higher degree compared to a cholesteric liquid crystal polymer comprising no missing cross-links/faults, as the faults/missing-cross link allow greater intramolecular movement. Two sides of the missing cross-links/faults may comprise groups capable of forming coordinate bonds with metal cations, in particular the two sides may comprise carboxylic acid. When the two sides are connected by forming a chelation complex with a metal ion, the intramolecular movement may be restricted. Hence, the cholesteric liquid crystal polymer may be configured to swell with water, wherein a degree of swelling, in particular a maximum degree of swelling, is limited by a metal cation concentration, more specifically earth alkali ion concentration, and in particular calcium concentration within the cholesteric liquid crystal polymer.

FIG. 1 schematically shows the introduction (i) of metal ions (iii) into cholesteric liquid crystal polymers and swelling (ii) of the cholesteric liquid crystal polymer by water. Without wishing to be bound by theory, and as depicted in FIG. 1, the aforementioned carboxylic acid groups may be bonded by forming a chelation complex with a metal cation (iii) introduced (ii) after the polymerization of the cholesteric liquid crystals. FIG. 1 schematically depicts three regions of the cholesteric liquid polymer regions, which all have the same structure. As shown in FIG. 1, the introduction (i) of the metal cation, may not occur equally in all regions. For example, in FIG. 1 in the region illustrated in the middle all missing cross-links/faults are bridged by the presence of a metal cation (iii) bonding with chelating agents on both sides of the missing cross-link. In the region illustrated on the left only part of the missing cross-links are bridged by metal cations (iii) and in the region illustrated to the right no missing cross-links are bridged by metal cations (iii). The cholesteric liquid crystal polymer may then absorb water (ii) in a second step, which may increase the thickness of the cholesteric liquid crystal. The increase in thickness may change the periodicity of the plurality of layers, which in turn changes the photonic band-gap, which finally changes the color the drawing substrate displays. The change in color may follow Bragg's law. The water absorption capacity and thereby the increase in thickness, may be altered by controlling the amount of metal cation present in the cholesteric liquid crystal polymer. As depicted in FIG. 1, a higher amount of metal cation results in a higher degree of bonding of carboxylic acid groups, and hence in the reduction of missing cross-links/faults. A higher degree of missing cross-links/faults leads to a higher water absorption capacity and the reduction of the degree of missing cross-links/faults leads to a lower water absorption capacity. When the cholesteric liquid crystal polymer contains no water, all regions of the cholesteric liquid crystal polymer show the same color. When water is added, different regions of the cholesteric liquid crystal polymer swell by different amounts, based on the metal cation content as depicted in FIG. 1. As a result, different regions of the cholesteric liquid crystal polymer may show the same color when no water is present in the cholesteric liquid crystal polymer and show different colors and thereby an image, when water is present in the cholesteric liquid crystal polymer. Further, the drawn structures and/or the overall drawing substrate may be iridescent.

Salt

In some embodiments, the one or more salts may comprise a cation capable of forming a chelation complex, more specifically a cation capable of forming a chelation complex with one or more carboxylic groups and in particular a cation capable of forming a chelation complex with two carboxylic groups. As described above, the one or more salts may comprise cations capable of forming a chelation complex, which may bond for example carboxylic acid groups, which in turn may reduce the amount missing cross-links/faults in the cholesteric liquid crystal. The carboxylic acid groups may be regarded as chelating agents.

In some embodiments, the one or more salts may comprise an alkaline earth metal salt, in particular a calcium salt. Alkaline earth metals, in particular calcium, may be form strong coordinate bonds with chelating agents. Further, alternatively or additionally the one or more salts may comprise zinc. Zinc may also form strong coordinate bonds with chelating agents. Alkaline earth metals and zinc may be divalent cations and may therefore form two bonds. Two ends forming a missing cross-link/faults may be bonded by a divalent cation, if the two ends are monovalent ligands, e.g. a carboxylic acid group.

In some embodiments, the one or more salts may comprise a monovalent anion, in particular a nitrite ion.

In some embodiments, the one or more salts may comprise a calcium salt, more specifically wherein the one or more salts may comprise at least 85% of the calcium salt, even more specifically at least 90 wt.-% of the calcium salt and in particular wherein the one or more salts may comprise at least 98 wt.-% of the calcium salt, relative to the total weight of the one or more salts.

In some embodiments, the one or more salts may comprise $Ca(NO_3)_2$, more specifically wherein the one or more salts may comprise at least 85% of $Ca(NO_3)_2$, even more specifically at least 90 wt.-% $Ca(NO_3)_2$ and in particular wherein the one or more salts may comprise at least 98 wt.-% $Ca(NO_3)_2$, relative to the total weight of the one or more salts. $Ca(NO_3)_2$ may exhibit a high water solubility. As a result, high amounts of calcium ions can be introduced to the drawing substrate within a smaller water volume compared to other calcium salts.

Cholesteric Liquid-Crystal

In some embodiments, the cholesteric liquid-crystals may be present in the form of a photonic crystals, more specifically as cholesteric liquid crystals layer. As described photonic crystals may influence the wavelength of light, in particular due to diffraction.

In some embodiments, the cholesteric liquid crystals may comprise polymer stabilized cholesteric liquid crystals. The term "polymer stabilized cholesteric liquid crystals" within this disclosure may i.a. refer to its common meaning in the art. Additionally or alternatively, the term "polymer stabilized cholesteric liquid crystals" may refer to a material wherein a polymer network is formed within a liquid crystal matrix, more specifically an anisotropic liquid crystal matrix and in particular an anisotropic cholesteric liquid crystal matrix. Additionally or alternatively, the term "polymer stabilized cholesteric liquid crystals" may refer to a material comprising a bi-continuous system, wherein the bi-continuous system comprises a polymer network permeating a continuous liquid crystal phase. The polymer stabilized cholesteric liquid crystals may exhibit missing cross-links/faults within the polymer matrix, similar to the cholesteric liquid crystal polymer. The missing cross-links/faults may allow the polymer stabilized cholesteric liquid crystals to swell with water. Similar to the cholesteric liquid crystal polymer, the two sides of the missing cross-links/faults may comprise groups capable of forming coordinate bonds with metal cations, in particular the two sides may comprise carboxylic acid. Hence, the polymer stabilized cholesteric liquid crystals may be configured to swell with water, wherein a degree, in particular a maximum degree of swelling, is limited by a metal cation concentration, more specifically earth alkali ion concentration, and in particular calcium concentration within the polymer stabilized cholesteric liquid crystals. When the polymer swells the length between the cholesteric liquid crystals within the liquid crystal matrix layers may be increased, which would alter the periodicity of the layer, which in turn would change the color displayed by the cholesteric liquid crystals.

In some embodiments, the cholesteric liquid crystals may comprise cholesteryl benzoate, cholesteryl nonanoate and/or cholesteryl oleyl carbonate. In some embodiments, the cholesteric liquid crystals may comprise 1,4-Bis-[4-(3-acryloyloxypropyloxy)benzoyloxy]-2-Methylbenzene, 4-Methoxyphenyl 4-((6-(acryloyloxy)hexyl)oxy)benzoate, 4-(acryloyloxyhexyloxy) benzoic acid, 2-Methyl-4-[6-(acryloyloxy)hexyloxy]benzoic acid, 4-Cyano-4'-pentylbiphenyl, 1,4:3,6-Dianhydro-D-glucitol bis[4-[[4-[[[4-[(1-oxo-2-propenyl)oxy]butoxy]carbonyl]oxy]benzoyl]oxy] benzoate] and/or 1,2-Diphenyl-2,2-dimethoxyethanone. The aforementioned compounds may be mesogens and may form cholesteric liquid crystals, in particular cholesteric liquid crystal polymers. The mesogens may be comprised within the cholesteric liquid crystals in a cross-linked form, in particular as opposed to individual molecules.

Carrier Structure

In some embodiments, the drawing substrate may comprise a carrier structure, in particular a carrier layer. The carrier structure may give mechanical support to the drawing substrate. Alternatively or additionally, the carrier structure may allow transferring the drawing substrate between different surfaces. In some embodiments, the user may draw on the drawing substrate with the writing instrument on a hard surface, such as a table. Subsequently, the user may transfer drawing to a different surface, for example attach it to a wall.

In some embodiments, the carrier structure may comprise paper, glass and/or a polymer. Glass may give strong mechanical support and may allow light to enter the carrier structure from both side, as the glass may be transparent. A paper and/or polymer substrate, e.g. a polymer foil, may be flexible and may be used to attach the drawing substrate to uneven surfaces.

In some embodiments, the drawing substrate may be comprised within a notebook.

Figure 3:
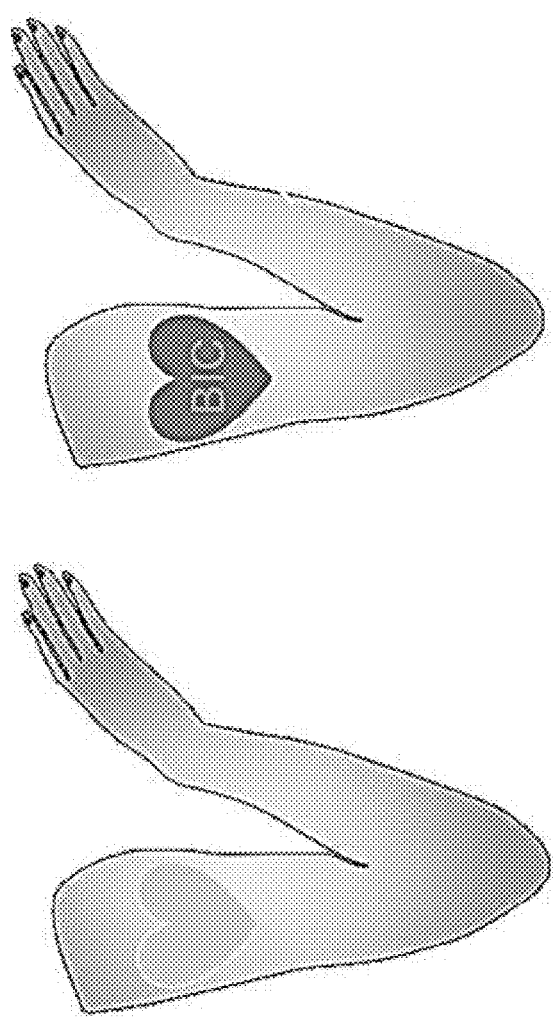
FIG. 3 schematically illustrates a decal that shows no drawn structure when dry (left) and a drawn structure when wet (right).

In some embodiments, the carrier structure may be removably attached to the drawing substrate. In some embodiments, the drawing substrate may be a decal configured to be applied to skin. The user may draw on the drawing substrate attached to the carrier structure, then remove the carrier structure from the drawing substrate and using an adhesive apply the drawing substrate to skin. The adhesive may already be present between the carrier structure and the drawing substrate but may only weakly adhere to the carrier structure, thus allowing removal of the carrier structure. The decal may then show no drawn structure, until the user adds water to the drawing substrate. This may allow the user to display removable tattoos at will. For example, a user may choose not to show a drawn structure at work, but only in his free time and does not have to remove the decal in between these two activities. FIG. 3 schematically illustrates a decal that shows no drawn structure when dry (left) and a drawn structure when wet (right). Alternatively, the drawing substrate may draw small amounts of water from the underlying skin to always show the drawn structure. In some embodiments, the drawing substrate may comprise a water impermeable layer. In some embodiments, the water-impermeable layer may be disposed between the drawing substrate and the carrier structure, such that its blocks the drawing structure from receiving water from the user's skin.

Water Absorption

In some embodiments, the drawing substrate may be configured to absorb water. The drawing substrate may comprise a water-absorbing layer. The drawing substrate may comprise a water-absorbing polymer, more specifically a thermoresponsive polymer and/or a superabsorbent polymer, and in particular poly(N-isopropylacrylamide) and/or cellulose acetate nanofibers. More specifically, the water-absorbing layer may comprise, consist of or substantially consist of the water-absorbing polymer. The term "thermoresponsive polymer" i.a. refers to its common meaning in the art. Additionally or alternatively, the term "thermoresponsive polymer" refer to polymers that exhibit a drastic and discontinuous change of their physical properties with temperature. Some thermoresponsive polymers may exhibit a drastic, discontinuous and reversible change of their conformation with temperature. For example, poly(N-isopropylacrylamide) may undergo a change of conformation above a threshold temperature. Below the threshold temperature the poly(-isopropylacrylamide) may be able to absorb than above the threshold temperature, which may lead to the poly(N-isopropylacrylamide) excreting water when its temperature rises above the threshold temperature.

Alternatively or additionally, the water-absorbing layer may comprise a hydrophilic salt, in particular calcium chloride. The drawing substrate absorbing water may allow the drawing substrate to continuously display structures drawn by the user, for example by being supplied with water by the water-absorbing layer. Alternatively or additionally, the water-absorbing layer may only supply water to the drawing substrate, in particular the cholesteric liquid crystals, at certain temperature ranges or at certain temperature thresholds. For example, a thermoresponsive polymer, such as poly(N-isopropylacrylamide), may absorb water below a threshold temperature and expulse water above the threshold temperature. The thermoresponsive polymer may absorb water including from cholesteric liquid crystals below the threshold temperature, resulting in the structure drawn by the user not being displayed. Subsequently, the user may expose the drawing substrate to an increased temperature, for example by attaching it to its skin or to the skin of another person, whereby the drawing substrate is heated by the body heat of the user or of the other person or whereby the drawing substrate is heated by the heat of an external stimulus e.g. by using a hairdryer or other heat-generating appliance. Due to the heat the thermoresponsive polymer may expel water, which may be absorbed by the cholesteric liquid crystals, leading to the drawing substrate to display the structure drawn by the user.

The water absorption capacity and/or the amount of water the thermoresponsive polymer can expel may be increased by combining it with a second polymer, e.g. a hydrogel, to form an interpenetrating polymer network. The term "interpenetrating polymer network" within this disclosure i.a. refers to its common meaning in the art. Within this disclosure it may refer in particular to polymers comprising at least two different types of macromolecules. The macromolecules may form networks, wherein the networks may be at least partially interlaced on a polymer scale but not covalently bonded to each other. In embodiments, one of the at least two different types of macromolecules may be that constituting the thermoresponsive polymer and the other may be that constituting the hydrogel. As a result, the thermoresponsive polymer's macromolecules may interpenetrate the hydrogel's macromolecules. Without wishing to be bound by theory, it is believed that at temperatures below the lower critical solution temperature the interpenetrating polymer network may absorb water, in particular due to the presence of polar side groups. The absorption of water may lead to an increase in volume of the interpenetrating polymer network. At temperatures above the lower critical solution temperature the thermoresponsive polymer's macromolecules may collapse and release absorbed water. The collapse of the thermoresponsive polymer's macromolecules and/or the release of water may lead to a volume decrease of the interpenetrating polymer network which in turn may lead to a release of water by the hydrogel's macromolecules.

The synthesis of interpenetrating networks is known in the art. For example, in a first step poly(N-isopropylacrylamide) may form a first three-dimensional network when cross-linked with N,N'-methylene-bis-acrylamide. The first three-dimensional network may then be suspended in an aqueous solution comprising for example sodium alginate, according to some embodiments. The sodium alginate may then be crosslinked by the addition of $CaCl_2$) to form a second three-dimensional network which interlaces the first three-dimensional network.

In some embodiments, the water-absorbing polymer may comprise carbon fiber nanotubes. The carbon fiber nanotubes may absorb light, in particular the carbon fiber nanotubes may absorb light and convert it to heat. As a result, the carbon fiber nanotubes may heat the drawing substrate and in particular the water-absorbing layer when exposed to sunlight, which may lead to display of the drawn structure when the drawing substrate is exposed to sunlight. Additionally the carbon fiber nanotubes may improve the mechanical properties of the drawing substrate.

Adhesive

In some embodiments, the drawing substrate may be configured to be adhesive, in particular wherein the carrier structure may be configured to be adhesive. The drawing substrate and/or carrier structure being adhesive may allow the user to attach the drawing substrate to a variety of surfaces. The drawing substrate may comprise an adhesive or an adhesive layer. In some embodiments, the drawing substrate may comprise an adhesive, such as a glue. Alternatively, the drawing substrate may also be adhesive itself. In some embodiments, the drawing substrate may comprise a carrier structure consisting of an adhesive silicone.

In some embodiments, the adhesive may comprise an acrylic adhesive, a rubber and/or a silicone. The acrylic adhesive may allow permanently attaching the drawing substrate to surfaces. Rubber and/or silicon may allow reversible attachment. Further, the use of silicone may allow attaching the drawing substrate to glass, for example windows.

Writing Instrument

By "writing instrument" is meant an instrument which is held by a human and is used to write (or draw) on a surface.

In some embodiments, the writing instrument may comprise a writing orifice, more specifically wherein the writing orifice comprises, a felt tip, a writing ball or a nib. The writing orifice may be just an opening, or comprise a felt tip, writing ball or nib, for example for a more even dispersal of the solution comprising one or more salts.

In some embodiments, the solution may be an aqueous solution. Aqueous solutions may solute higher concentrations of the one or more salts compared to for example solutions based on non-polar solvents.

In some embodiments, writing instrument may comprise an ink container, more specifically an ink container comprising the solution.

In some embodiments, the concentration of the one or more salts in the solution may be between about 0.01 mM to about 100 mM, more specifically between about 0.1 mM to about 50 M and in particular between about 1 M to about 10 mM.

In some embodiments, the writing instrument may comprise a first water container, wherein the first water container may comprise at least water. The first water container may comprise additionally compounds including but not limited to preservatives, surfactants or gelling agents.

In some embodiments, a material of the ink container and/or the first water container may comprise a polymer, a metal and/or a ceramic.

Selection Mechanism

In some embodiments, the writing instrument may comprise a mixing chamber fluidly connected to the ink container, the first water container and the writing orifice. The mixing chamber may be used to adjust the concentration of the one or more salts in the solution before it is dispensed from the writing orifice.

In some embodiments, the writing instrument may comprise a concentration adjustment mechanism, wherein the concentration adjustment mechanism may be configured to adjust the concentration the one or more salts in the solution dispensed by the writing instrument. The concentration adjustment mechanism may comprise a control wheel and/or a slider button. The control wheel and/or slider button may comprise color markings to indicate to the user, which color the drawing substrate will display after the solution comprising the one or more salts has been dispensed on the drawing substrate and water is present in the drawing substrate.

In some embodiments, the writing instrument may comprise a plurality of containers comprising different concentration of the one or more salts in the solution, wherein the concentration adjustment mechanism may be configured to switch between the plurality of containers. Each of the plurality of containers may correspond to a specific desired color. For example, the user may at first want to draw a structure in red and use a first container comprising a concentration configured to turn the drawing substrate red, when water is present. The user may then switch to a second container to draw a second blue structure.

Water Spraying Mechanism

In some embodiments, the system may comprise a spraying mechanism configured to create an aerosol, in particular a water aerosol. The water spraying mechanism may allow the user to add water to the drawing substrate, such that it displays drawn structures.

In some embodiments, the system may comprise a second water container fluidly connected to the spraying mechanism.

In some embodiments, the spraying mechanism may be comprised within the writing instrument. The spraying mechanism may be fluidly connected to the first water container. Including the spraying mechanism within the writing instrument may improve the user experience of the system, as the user does not need to switch between the writing instrument and the water spraying mechanism.

Layers

In some embodiments, the drawing substrate may comprise at least two layers, wherein a top layer may be the cholesteric crystal layer and a bottom layer may be the carrier layer, in particular wherein the top layer may be configured to be written upon.

In some embodiments, the drawing substrate may comprise at least three layers, wherein a top layer may be the cholesteric crystal layer, a middle layer may be the water-absorbent layer and a bottom layer may be the carrier layer. In some embodiments, the adhesive layer may be placed between the middle layer and bottom layer, or the adhesive layer may be placed between the top layer and the bottom layer. The adhesive layer being placed between the middle layer and bottom layer or the top layer and bottom layer, may allow detaching the bottom layer and attaching the drawing substrate without the bottom layer to another surface. For example, the user may draw a desired structure on the drawing substrate including the bottom layer, which may be for example the carrier layer giving mechanical support to the drawing substrate. Subsequently, the user may remove the bottom layer and attach the rest of the drawing substrate to a different surface. For example, the user may attach the drawing substrate to skin as a decal.

In some embodiments, the adhesive layer may be connected to the bottom layer. The adhesive layer being connected to the bottom layer may allow attaching the drawing substrate to other surfaces directly after drawing.

Standalone

In a second aspect, the present disclosure relates to a writing instrument according to any preceding embodiment. Any embodiments and their combinations as described for the writing instrument of the first aspect, are equally applicable to the writing instrument according to the second aspect.

In a third aspect, the present disclosure relates to a use of a writing instrument as defined in any preceding embodiment for marking a drawing substrate as defined in any preceding embodiment.

In a fourth aspect, the present disclosure relates to a use of a drawing substrate as defined in any preceding embodiment for being marked by a solution as defined in any of the preceding embodiments or by a writing instrument as defined in any of the preceding embodiments.

In a fifth aspect, the present disclosure relates to a use of the solution of one or more salts as defined in any of the preceding embodiments in a writing instrument as defined in any of the preceding embodiment or a system as defined in any of the preceding embodiments.

In a sixth aspect, the present disclosure relates to a drawing substrate according to any preceding embodiment. Any embodiments and their combinations as described for the drawing substrate of the first aspect, are equally applicable to the drawing substrate according to the sixth aspect.

In a seventh aspect, the present disclosure relates to the spraying mechanism according to any preceding embodiment. Any embodiments and their combinations as described for the spraying mechanism of the first aspect, are equally applicable to the spraying mechanism according to the seventh aspect.

Method of Manufacturing

In an eighth aspect, the present disclosure relates to a method for manufacturing a drawing substrate according to any preceding embodiment, wherein the method comprises the following steps:

dissolving one or more mesogens in a first solvent;
    applying the one or more mesogens to a carrier structure;
    evaporating the first solvent;
    shearing the mesogens along one direction;
    curing the one or more mesogens by exposure to UV-light;
    rinsing the cured one or more mesogens with a second solvent;
    rinsing the cured one or more mesogens with KOH.

Figure 2:
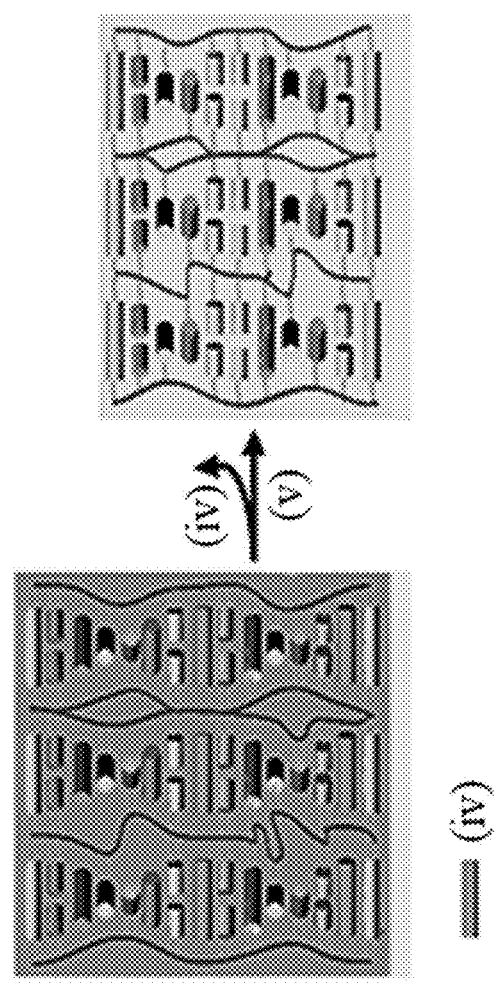
FIG. 2 schematically shows the removal of non-reactive mesogens (iv) by adding KOH (v) from cholesteric liquid crystals.

The method according to the eight aspect may dispose cholesteric liquid crystals on the carrier structure. The mesogens may form the cholesteric liquid crystal, in particular the cholesteric liquid crystal polymer. The one or more mesogens may include at least one non-reactive mesogen. The KOH may rinse the non-reactive mesogen out of the cholesteric liquid crystals, in particular the cholesteric liquid crystal polymer. FIG. 2 schematically shows the removal of non-reactive mesogens (iv) by adding KOH (v). Rinsing the non-reactive mesogens out of the cholesteric liquid crystals may lead to volume shrinkage of the cholesteric liquid crystals, as depicted in FIG. 2. The volume shrinkage may be reversed by swelling the cholesteric liquid crystals in water. However, the swelling may be limited by infusing the cholesteric liquid crystals with a salt.

In some embodiments according to the eighth aspect, the one or more mesogens may comprise 1,4-Bis-[4-(3-acryloyloxypropyloxy)benzoyloxy]-2-Methylbenzene, 4-Methoxyphenyl 4-((6-(acryloyloxy)hexyl)oxy)benzoate, 4-(acryloyloxyhexyloxy) benzoic acid, 2-Methyl-4-[6-(acryloyloxy)hexyloxy]benzoic acid, 4-Cyano-4'-pentylbiphenyl, 1,4:3,6-Dianhydro-D-glucitol bis[4-[[4-[[[4-[(1-oxo-2-propenyl)oxy]butoxy]carbonyl]oxy]benzoyl]oxy]benzoate], 1,2-Diphenyl-2,2-dimethoxyethanone and/or 4-Cyano-4'-pentylbiphenyl and in particular 4-Cyano-4'-pentylbiphenyl. The aforementioned one or more mesogens may form cholesteric liquid crystals and in particular cholesteric liquid crystal polymer. The cyano-4'-pentylbiphenyl may be a non-reactive mesogen and lead to the formation of missing cross-links/faults within the cholesteric liquid crystals, in particular within the cholesteric liquid crystal polymer. In particular, the benzoic acid groups of the 4-(acryloyloxyhexyloxy) benzoic acid and 2-Methyl-4-[6-(acryloyloxy) hexyloxy]benzoic acid may provide the carboxylic acid groups which may act as the chelating agents.

The 1,4-Bis-[4-(3-acryloyloxypropyloxy)benzoyloxy]-2-Methylbenzene may be available under the tradename LC756, 4-Methoxyphenyl 4-((6-(acryloyloxy)hexyl)oxy) benzoate, 4-(acryloyloxyhexyloxy) benzoic acid under the tradename Irgacure 651, 2-Methyl-4-[6-(acryloyloxy)hexyloxy]benzoic acid und the tradename RM105, 4-Cyano-4'-pentylbiphenyl, 1,4:3,6-Dianhydro-D-glucitol bis[4-[[4-[[[4-[(1-oxo-2-propenyl)oxy]butoxy]carbonyl]oxy]benzoyl]oxy]benzoate] under the tradename 6OBA, 1,2-Diphenyl-2,2-dimethoxyethanone und the tradename 6OBA-M and 4-Cyano-4'-pentylbiphenyl und the tradename SCB.

In some embodiments according to the eighth aspect, the one or more mesogens may comprise between about 15 wt.-% to about 20 wt.-% of 1,4-Bis-[4-(3-acryloyloxypropyloxy)benzoyloxy]-2-Methylbenzene, between about 20 wt.-% to about 25 wt.-% of 4-Methoxyphenyl 4-((6-(acryloyloxy)hexyl)oxy)benzoate, between about 15 wt.-% to about 20 wt.-% of 4-(acryloyloxyhexyloxy) benzoic acid, between about 15 wt.-% to about 20 wt.-% of 2-Methyl-4-[6-(acryloyloxy)hexyloxy]benzoic acid, between about 15 wt.-% to about 20 wt.-% of 4-Cyano-4'-pentylbiphenyl, between about 3 wt.-% to about 7 wt.-% of 1,4:3,6-Dianhydro-D-glucitol bis[4-[[4-[[[4-[(1-oxo-2-propenyl)oxy]butoxy]carbonyl]oxy]benzoyl]oxy]benzoate] and/or between about 0.30 wt.-% to about 1 wt.-% of 1,2-Diphenyl-2,2-dimethoxyethanone.

In some embodiments according to the eighth aspect, the carrier structure may comprise paper, glass and/or a polymer.

In some embodiments according to the eighth aspect, the first solvent may be an aprotic solvent, in particular tetrahydrofuran.

In some embodiments according to the eighth aspect, the curing by UV light may be performed between about 1 min to about 60 min, more specifically between about 2 min to about 30 min and in particular 3 min to about 10 min.

In some embodiments according to the eighth aspect, the KOH may have a concentration between about 10 mM to about 10 M, more specifically between about 100 mM to about 5 M and in particular between about 500 mM to about 2 M.

In some embodiments according to the eighth aspect, the shearing of the mesogens may be performed by placing a glass sheet on the one or more mesogens and dragging it in the one direction, in particular wherein the glass may be a fluorinated alkylsilane glass.

In some embodiments according to the eighth aspect, the shearing may be performed at between about 15 to about 30° C., and in particular at room temperature.

Although the present disclosure is defined in the attached claims, it should be understood that the present disclosure can also (alternatively) be defined in accordance with the following aspects:

1. In a first aspect, the present disclosure relates to a system comprising:
   a writing instrument, wherein the writing instrument comprises a solution of one or more salts and a writing orifice; and
   a drawing substrate configured to change color based on the concentration of the one or more salts and/or water content,
   wherein the drawing substrate comprises cholesteric liquid-crystals.
2. The system according to aspect 1, wherein the one or more salts comprise a cation capable of forming a chelation complex, more specifically a cation capable of forming a chelation complex with one or more carboxylic groups and in particular a cation capable of forming a chelation complex with two carboxylic groups.
3. The system according to any preceding aspect, wherein the one or more salts comprise an alkaline earth metal salt, in particular a calcium salt.
4. The system according to any preceding aspect, wherein the one or more salts comprise a monovalent anion, in particular a nitrite.
5. The system according to any preceding aspect, wherein the one or more salts comprises a calcium salt, more specifically wherein the one or more salts comprises at least 85% of the calcium salt, even more specifically at least 90 wt.-% of the calcium salt and in particular wherein the one or more salts comprises at least 98 wt.-% of the calcium salt, relative to the total weight of the one or more salts.
6. The system according to any preceding aspect, wherein the one or more salts comprises $Ca(NO_3)_2$, more specifically wherein the one or more salts comprises at least 85% of $Ca(NO_3)_2$, even more specifically at least 90 wt.-% $Ca(NO_3)_2$ and in particular wherein the one or more salts comprises at least 98 wt.-% $Ca(NO_3)_2$, relative to the total weight of the one or more salts.
7. The system according to any preceding aspect, wherein the cholesteric liquid-crystals are present in the form of a photonic crystals, more specifically as cholesteric liquid crystals layer.
8. The system according to any preceding aspect, wherein the cholesteric liquid crystals comprise cholesteric liquid crystal polymers.
9. The system according to any preceding aspect, wherein the cholesteric liquid crystals comprise polymer stabilized cholesteric liquid crystals.
10. The system according to any preceding aspect, wherein the cholesteric liquid crystals comprise cholesteryl benzoate, cholesteryl nonanoate and/or cholesteryl oleyl carbonate.
11. The system according to any preceding aspect, wherein the cholesteric liquid crystals comprise 1,4-Bis-[4-(3-acryloyloxypropyloxy)benzoyloxy]-2-Methylbenzene, 4-Methoxyphenyl 4-((6-(acryloyloxy)hexyl)oxy)benzoate, 4-(acryloyloxyhexyloxy) benzoic acid, 2-Methyl-4-[6-(acryloyloxy)hexyloxy]benzoic acid, 4-Cyano-4'-pentylbiphenyl, 1,4:3,6-Dianhydro-D-glucitol bis[4-[[4-[[[4-[(1-oxo-2-propenyl)oxy]butoxy]carbonyl]oxy]benzoyl]oxy]benzoate], and/or 1,2-Diphenyl-2,2-dimethoxyethanone.
12. The system according to any preceding aspect, wherein the drawing substrate comprises a carrier structure, in particular a carrier layer.
13. The system according to aspect 12, wherein the carrier structure comprises paper, glass and/or a polymer.
14. The system according to any preceding aspect, wherein the drawing substrate is comprised within a notebook.
15. The system according to any one of aspects 12 to 14, wherein the carrier structure is removably attached to the drawing substrate.
16. The system according to any preceding aspect, wherein the drawing substrate is configured to absorb water.
17. The system according to any preceding aspect, wherein the drawing substrate comprises a water-absorbing layer.
18. The system according to any preceding aspect, wherein the drawing substrate comprises a water-absorbing polymer, more specifically a thermoresponsive polymer and/or a superabsorbent polymer, and in particular poly(N-isopropylacrylamide) and/or cellulose acetate nanofibers.
19. The system according to aspect 17 or 18, wherein the water-absorbing layer comprises a hydrophilic salt, in particular calcium chloride.
20. The system according to aspect 18 or 19, wherein the water-absorbing polymer comprises carbon fiber nanotubes.

21. The system according to any preceding aspect, wherein the drawing substrate is configured to be adhesive, in particular wherein the carrier structure is configured to be adhesive.
22. The system according to any preceding aspect, wherein the drawing substrate comprises an adhesive.
23. The system according to any preceding aspect, wherein the drawing substrate comprises an adhesive layer.
24. The system according to aspect 22 or 23, wherein the adhesive comprises an acrylic adhesive, a rubber and/or a silicone.
25. The system according to any preceding aspect, wherein the drawing substrate comprises a water impermeable layer.
26. The system according to any preceding aspect, wherein the writing instrument comprises a writing orifice, more specifically wherein the writing orifice comprises, a felt tip, a writing ball or a nib.
27. The system according to any preceding aspect, wherein the solution is an aqueous solution.
28. The system according to any preceding aspect, wherein writing instrument comprises an ink container, more specifically an ink container comprising the solution.
29. The system according to any preceding aspect, wherein the concentration of the one or more salts in the solution is between about 0.01 mM to about 100 mM, more specifically between about 0.1 mM to about 50 M and in particular between about 1 M to about 10 mM.
30. The system according to any preceding aspect, wherein the writing instrument comprises a first water container, wherein the first water container comprises at least water.
31. The system according to any one of aspects 28 to 30, wherein a material of the ink container and/or the first water container comprise a polymer, a metal and/or a ceramic.
32. The system according to any preceding aspect, wherein the writing instrument comprises a mixing chamber fluidly connected to the ink container, the first water container and the writing orifice.
33. The system according to any preceding aspect, wherein the writing instrument comprises a concentration adjustment mechanism, wherein the concentration adjustment mechanism is configured to adjust the concentration the one or more salts in the solution dispensed by the writing instrument.
34. The system according to aspect 33, wherein the concentration adjustment mechanism comprises a control wheel and/or a slider button.
35. The system according to any preceding aspect, wherein the writing instrument comprises a plurality of containers comprising different concentration of the one or more salts in the solution, wherein the concentration adjustment mechanism is configured to switch between the plurality of containers.
36. The system according to any preceding aspect, wherein the system comprises a spraying mechanism configured to create an aerosol, in particular a water aerosol.
37. The system according to any preceding aspect, wherein the system comprises a second water container fluidly connected to the spraying mechanism.
38. The system according to any preceding aspect, wherein the spraying mechanism is comprised within the writing instrument.
39. The system according to any one of aspects 30 to 38, wherein the spraying mechanism is fluidly connected to the first water container.
40. The system according to any preceding aspect, wherein the drawing substrate comprises at least two layers, wherein a top layer is the cholesteric crystal layer and a bottom layer is the carrier layer, in particular wherein the top layer is configured to be written upon.
41. The system according to any preceding aspect, wherein the drawing substrate comprises at least three layers, wherein a top layer is the cholesteric crystal layer, a middle layer is the water-absorbent layer and a bottom layer is the carrier layer.
42. The system according to any one of aspects 23 to 41, wherein the adhesive layer is placed between the middle layer and bottom layer, or wherein the adhesive layer is placed between the top layer and the bottom layer.
43. The system according to any one of aspects 23 to 42, wherein the adhesive layer is connected to the bottom layer.
44. The system according to any preceding aspect, wherein the writing instrument is a handheld writing instrument.
45. A writing instrument according to any preceding aspect.
46. Use of a writing instrument as defined in any preceding aspect for marking a drawing substrate as defined in any preceding aspect.
47. Use of a drawing substrate as defined in any preceding aspect for being marked by a solution as defined in any of the preceding aspects or by a writing instrument as defined in any of the preceding aspects.
48. Use of the solution of one or more salts as defined in any of the preceding aspects in a writing instrument as defined in any of the preceding aspect or a system as defined in any of the preceding aspects.
49. A drawing substrate according to any preceding aspect.
50. A spraying mechanism according to any preceding aspect.
51. A method for manufacturing a drawing substrate according to any preceding aspect, wherein the method comprises:

dissolving one or more mesogens in a first solvent;
applying the one or more mesogens to a carrier structure;
evaporating the first solvent;
shearing the mesogens along one direction;
curing the one or more mesogens by exposure to UV-light;
rinsing the cured one or more mesogens with a second solvent;
rinsing the cured one or more mesogens with KOH.
52. The method according to aspect 51, wherein the one or more mesogens comprise 1,4-Bis-[4-(3-acryloyloxy-propyloxy)benzoyloxy]-2-Methylbenzene, 4-Methoxyphenyl 4-((6-(acryloyloxy)hexyl)oxy)benzoate, 4-(acryloyloxyhexyloxy) benzoic acid, 2-Methyl-4-[6-(acryloyloxy)hexyloxy]benzoic acid, 4-Cyano-4'-pentylbiphenyl, 1,4:3,6-Dianhydro-D-glucitol bis[4-[[4-[[[4-[(1-oxo-2-propenyl)oxy]butoxy]carbonyl]oxy]benzoyl]oxy]benzoate], 1,2-Diphenyl-2,2- dimethoxyethanone and/or 4-Cyano-4'-pentylbiphenyl and in particular 4-Cyano-4'-pentylbiphenyl.

53. The method according to any one of aspects 51 or 52, wherein the one or more mesogens comprise between about 15 wt.-% to about 20 wt.-% of 1,4-Bis-[4-(3-acryloyloxypropyloxy)benzoyloxy]-2-Methylbenzene, between about 20 wt.-% to about 25 wt.-% of 4-Methoxyphenyl 4-((6-(acryloyloxy)hexyl)oxy)benzoate, between about 15 wt.-% to about 20 wt.-% of 4-(acryloyloxyhexyloxy) benzoic acid, between about 15 wt.-% to about 20 wt.-% of 2-Methyl-4-[6-(acryloyloxy)hexyloxy]benzoic acid, between about 15 wt.-% to about 20 wt.-% of 4-Cyano-4'-pentylbiphenyl, between about 3 wt.-% to about 7 wt.-% of 1,4:3,6-Dianhydro-D-glucitol bis[4-[[4-[[[4-[(1-oxo-2-propenyl)oxy]butoxy]carbonyl]oxy]benzoyl]oxy]benzoate] and/or between about 0.30 wt.-% to about 1 wt.-% of 1,2-Diphenyl-2,2-dimethoxyethanone.

54. The method according to any one of aspects 51 to 53, wherein the carrier structure comprises paper, glass and/or a polymer.

55. The method according to any one of aspects 51 to 54, wherein the first solvent is an aprotic solvent, in particular tetrahydrofuran.

56. The method according to any one of aspects 51 to 55, wherein the curing by UV light is performed between about 1 min to about 60 min, more specifically between about 2 min to about 30 min and in particular 3 min to about 10 min.

57. The method according to any one of aspects 51 to 56, wherein the KOH has a concentration between about 10 mM to about 10 M, more specifically between about 100 mM to about 5 M and in particular between about 500 mM to about 2 M.

58. The method according to any one of aspects 51 to 57, wherein the shearing of the mesogens is performed by placing a glass sheet on the one or more mesogens and dragging it in the one direction, in particular wherein the glass is a fluorinated alkylsilane glass.

59. The method according to any one of aspects 51 to 58, wherein the shearing is performed at between about 15 to about 30° C., and in particular at room temperature.

The invention claimed is:

1. A system comprising:
   a writing instrument, wherein the writing instrument comprises a solution of one or more salts and a writing orifice; and
   a drawing substrate configured to change color based on the concentration of the one or more salts and/or water content,
   wherein the drawing substrate comprises cholesteric liquid-crystals and wherein the drawing substrate is configured to absorb water.

2. The system according to claim 1, wherein the one or more salts comprise a cation capable of forming a chelation complex.

3. The system according to claim 1, wherein the one or more salts comprise a cation capable of forming a chelation complex with one or more carboxylic groups.

4. The system according to claim 1, wherein the one or more salts comprise an alkaline earth metal salt.

5. The system according to claim 1, wherein the one or more salts comprise a calcium salt.

6. The system according to claim 1, wherein the one or more salts comprise a monovalent anion.

7. The system according to claim 1, wherein the one or more salts comprise a nitrite.

8. The system according to claim 1, wherein the one or more salts comprise $Ca(NO_3)_2$.

9. The system according to claim 1, wherein the one or more salts comprise at least 85% of the calcium salt, relative to the total weight of the one or more salts.

10. The system according to claim 1, wherein the cholesteric liquid crystals comprise cholesteric liquid crystal polymers.

11. The system according to claim 1, wherein the cholesteric liquid crystals comprise 1,4-Bis-[4-(3-acryloyloxypropyloxy) benzoyloxy]-2-Methylbenzene, 4-Methoxyphenyl 4-((6-(acryloyloxy) hexyl)oxy)benzoate, 4-(acryloyloxyhexyloxy) benzoic acid, 2-Methyl-4-[6-(acryloyloxy)hexyloxy]benzoic acid, 4-Cyano-4'-pentylbiphenyl, 1,4:3,6-Dianhydro-D-glucitol bis[4-[4-[[4-[(1-oxo-2-propenyl)oxy]butoxy]carbonyl]oxy]benzoyl]oxy]benzoate], and/or 1,2-Diphenyl-2,2-dimethoxyethanone.

12. The system according to claim 1, wherein the drawing substrate comprises a water-absorbing layer comprising poly(N-isopropylacrylamide) and/or cellulose acetate nanofibers.

13. The system according to claim 1, wherein the drawing substrate is configured to be adhesive.

14. The system according to claim 1, wherein the concentration of the one or more salts in the solution is between about 0.01 mM to about 100 mM.

15. The system according to claim 1, wherein the system comprises a spraying mechanism configured to create an aerosol.

16. A method for manufacturing a drawing substrate as defined in claim 1, wherein the method comprises:
   dissolving one or more mesogens in a first solvent;
   applying the one or more mesogens to a carrier structure;
   evaporating the first solvent;
   shearing the mesogens along one direction;
   curing the one or more mesogens by exposure to UV-light;
   rinsing the cured one or more mesogens with a second solvent;
   rinsing the cured one or more mesogens with KOH.

17. A system comprising:
   a writing instrument, wherein the writing instrument comprises a solution of one or more salts and a writing orifice; and
   a drawing substrate configured to change color based on the concentration of the one or more salts and/or water content,
   wherein the drawing substrate comprises cholesteric liquid-crystals, and
   wherein the writing instrument comprises an ink container, a first water container comprising at least water, and a mixing chamber fluidly connected to the ink container, the first water container and the writing orifice.

18. A system comprising:
   a writing instrument, wherein the writing instrument comprises a solution of one or more salts and a writing orifice; and
   a drawing substrate configured to change color based on the concentration of the one or more salts and/or water content,
   wherein the drawing substrate comprises cholesteric liquid-crystals, and wherein the writing instrument comprises a concentration adjustment mechanism, wherein the concentration adjustment mechanism is configured to adjust the concentration of the one or more salts in the solution dispensed by the writing instrument.

* * * * *